United States Patent
Kuan et al.

(10) Patent No.: US 10,366,232 B1
(45) Date of Patent: Jul. 30, 2019

(54) LANGUAGE-BASED MISSING FUNCTION CALL DETECTION

(71) Applicant: HRL Laboratories, LLC, Malibu, CA (US)

(72) Inventors: George Kuan, Westlake Village, CA (US); Aleksey Nogin, Fresno, CA (US); Alexei Kopylov, Pasadena, CA (US)

(73) Assignee: HRL Laboratories, LLC, Malibu, CA (US)

( * ) Notice: Subject to any disclaimer, the term of this patent is extended or adjusted under 35 U.S.C. 154(b) by 258 days.

(21) Appl. No.: 15/284,025

(22) Filed: Oct. 3, 2016

Related U.S. Application Data

(60) Provisional application No. 62/236,764, filed on Oct. 2, 2015.

(51) Int. Cl.
| | | |
|---|---|---|
| *G06F 11/00* | (2006.01) | |
| *G06F 12/14* | (2006.01) | |
| *G06F 12/16* | (2006.01) | |
| *G08B 23/00* | (2006.01) | |
| *G06F 21/56* | (2013.01) | |
| *G06F 21/57* | (2013.01) | |

(52) U.S. Cl.
CPC .......... *G06F 21/563* (2013.01); *G06F 21/577* (2013.01); *G06F 2221/033* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 2007/0112847 | A1* | 5/2007 | Dublish | G06F 21/577 |
| 2008/0184208 | A1* | 7/2008 | Sreedhar | G06F 21/577 |
| | | | | 717/128 |
| 2009/0282208 | A1* | 11/2009 | Chen | G06B 8/437 |
| | | | | 711/170 |
| 2010/0192129 | A1* | 7/2010 | Langworthy | G06F 8/437 |
| | | | | 717/126 |
| 2012/0023486 | A1* | 1/2012 | Haviv | G06F 21/577 |
| | | | | 717/126 |
| 2012/0159619 | A1* | 6/2012 | Berg | G06F 21/577 |
| | | | | 726/22 |
| 2014/0143764 | A1* | 5/2014 | Kerschbaum | G06F 8/437 |
| | | | | 717/143 |
| 2015/0058997 | A1* | 2/2015 | Lee | G06F 9/45558 |
| | | | | 726/26 |
| 2015/0096034 | A1* | 4/2015 | O'Neil | G06F 21/577 |
| | | | | 726/25 |

(Continued)

OTHER PUBLICATIONS

Lantian Zheng and Andrew C. Myers. Dynamic security labels and noninterference. In Proc. 2nd Workshop on Formal Aspects in Security and Trust, IFIP TC1 WG1.7. Springer, Aug. 2004.*

(Continued)

*Primary Examiner* — Lynn D Feild
*Assistant Examiner* — Vadim Savenkov
(74) *Attorney, Agent, or Firm* — Tope-McKay & Associates

(57) ABSTRACT

Described is a language-based system for detecting function calls. The system detects missing authorization and authentication functionality in computer software source code via typechecking. New classes of software vulnerability in the computer software source code are detected.

18 Claims, 4 Drawing Sheets

(56) References Cited

U.S. PATENT DOCUMENTS

2015/0309813 A1* 10/2015 Patel .................... G06F 8/75 703/22

OTHER PUBLICATIONS

N. Swamy, B. J. Corcoran, and M. Hicks. Fable: A language for enforcing user-defined security policies. In Proc. of the 2008 IEEE Symposium on Security and Privacy, pp. 369-383, Oakland, CA, May 2008.*

Nikhil Swamy, Michael Hicks, Stephen Tse, and Steve Zdancewic. Managing policy updates in security-typed languages. In Proc. 19th IEEE Computer Security Foundations Workshop, pp. 202-216, Jul. 2006.*

Henry G. Baker. Lively linear lisp—look ma, no garbage! ACM SIGPLAN Notices, 27(8): pp. 89-98, 1992.

Lujo Bauer, Jarred Ligatti, and David Walker. Types and effects for non-interfering program monitors. In Proceedings of the 2002 Mext-NSF-JSPS international conference on Software security: theories and systems, ISSS'02, pp. 154-171, Berlin, Heidelberg, 2003. Springer-Verlag.

Stephen Chong. Required information release. In Proceedings of the 23rd IEEE Computer Security Foundations Symposium, CSF 2010, Edinburgh, United Kingdom, Jul. 17-19, 2010.

Ravi Chugh, Jeffrey A. Meister, Ranjit Jhala, and Sorin Lerner. Staged information flow for javascript. In Proceedings of the 2009 ACM SIGPLAN conference on Programming language design and implementation, PLDI '09, pp. 50-62, New York, NY, USA, 2009.

Cedric Fournet, Andrew Gordon, and Sergio Maffeis. A type discipline for authorization in distributed systems. In Proceedings of the 20th IEEE Computer Security Foundations Symposium, CSF '07, pp. 31-48, Washington, DC, USA, 2007.

William L. Harrison and James Hook. Achieving information flow security through monadic control of effects. J. Comput. Secur, 17(5): pp. 599-653, 2009.

Nevin Heintze and Jon G. Riecke. The slam calculus: programming with secrecy and integrity. In Proceedings of the 25th ACM SIGPLAN-SIGACT symposium on Principles of programming languages, POPL '98, pp. 365-377, New York, NY, USA, 1998.

Sebastian Hunt and David Sands. On flow-sensitive security types. In J. Gregory Morrisett and Simon L. Peyton Jones, editors, POPL, pp. 79-90. ACM, 2006.

Atsushi Igarashi and Naoki Kobayashi. Resource usage analysis. In Proceedings of the 29th ACM SIGPLAN-SIGACT symposium on Principles of programming languages, POPL '02, pp. 331-342, New York, NY, USA, 2002. ACM. ISBN 1-58113-450-9.

Yves Lafont. The linear abstract machine. In Theoretical Computer Science, 1988, pp. 157-180.

Ana Almeida Matos and José Fragoso Santos. Typing illegal information flows as program effects. In Proceedings of the 7th Workshop on Programming Languages and Analysis for Security, PLAS '12, pp. 1:1-1:12, New York, NY, USA, 2012.

K. R. O'Neill, M. R. Clarkson, and S. Chong. Information-flow security for interactive programs. In Proceedings of the 19th IEEE Computer Security Foundations Workshop. IEEE Computer Society, Jun. 2006, pp. 1-12.

Jens Palsberg. Type inference for objects. Computing Surveys, 28(2): pp. 358-359, Jun. 1996.

François Pottier and Vincent Simonet. Information flow inference for ml. In Proceedings of the 29th ACM SIGPLAN-SIGACT symposium on Principles of programming languages, POPL '02, pp. 319-330, New York, NY, USA, 2002.

John C. Reynolds. Syntactic control of interference. In ACM Symposium on Principles of Programming Langauges (POPL), Tucson, Arizona, Jan. 1978, pp. 39-46.

John C. Reynolds. Syntactic control of interference, part 2. Technical report, Carnegie-Mellon University, Apr. 1989, pp. 1-19.

J.A. Robinson. A machine-oriented logic based on the resolution principle. J. ACM 12, 1: pp. 23-41, Jan. 1965.

Geoffrey S. Smith. Principal type schemes for functional programs with overloading and subtyping. Science of computer Programming, 23(2-3): pp. 197-226, Dec. 1994.

Philip Wadler. Linear types can change the world. In IFIP TC 2 Working Conference on Programming Concepts and Methods, Sea of Galilee, Israel, Apr. 1990, pp. 561-581.

Lantian Zheng and Andrew C. Myers. Dynamic security labels and static information flow control. Int. J. Inf. Secur., 6 (2): pp. 67-84, Mar. 2007.

Nels E. Beckman and Aditya Nori. Probabilistic, Modular and Scalable Inference of Typestate Specifications. In Proceedings of the 32nd ACM SIGPLAN Conference on Programming Language Design and Implementation (PLDI 11) San Jose, USA. Jun. 2011, pp. 1-11.

* cited by examiner

LANGUAGE-BASED MISSING FUNCTION CALL DETECTION

CROSS-REFERENCE TO RELATED APPLICATIONS

This is a Non-Provisional application of U.S. Provisional Application No. 62/236,764, filed in the United States on Oct. 2, 2015, entitled, "Language-Based Missing Function Call Detection," the entirety of which is hereby incorporated by reference as though fully set forth herein.

BACKGROUND

(1) Field of Invention

The present invention relates to a system for detecting missing authorization and authentication functionality in source code and, more particularly, to a system for detecting missing authorization and authentication functionality in source code via type checking according to a variant of a security-type system.

(2) Description of Related Art

The research of security policy of software and, in particular, of information flow policy has a long history. Despite the fact that a variety of security languages and other approaches have been proposed, none of them is widely used. The main reason for this is the difficulty in writing and understanding the security policy.

Previous research has considered techniques, such as substructural type systems, for enforcing ordering of particular function calls (see the List of Incorporated Literature References, Literature Reference Nos. 1, 10, 15, 16, and 19). Such techniques could only enforce simple relationships, such as "a file must be opened before it can be closed", and not implications of ordering on security contexts for varying levels of security-sensitive operations.

Further, prior information flow checking processes only support a very simple notion of ordering in the sense of flow-sensitivity (i.e., different courses through control flow may disclose varying amounts of information), such as described in Literature Reference No. 8.

Thus, a continuing need exists for an approach that improves the flexibility of the information flow policy mechanism, thus enabling more precise policies.

SUMMARY OF THE INVENTION

The present invention relates to a system for detecting missing authorization and authentication functionality in source code and, more particularly, to a system for detecting missing authorization and authentication functionality in source code via type checking according to a variant of a security-type system. The system comprises one more processors and a memory having instructions such that when the instructions are executed, the one or more processors perform multiple operations. The system detects missing authorization and authentication functionality in computer software source code via typechecking, and detects at least one new class of software vulnerability in the computer software source code.

In another aspect, at least one security label is assigned to each function identifier in a function call, wherein the at least one security label is assigned to each function identifier to enable information flow, thereby enforcing a requirement that certain function calls must precede other function calls.

In another aspect, each function identifier is mapped to a tuple of two security labels, a first security label for a security level required for executing the function call and a second security label for a security level granted upon execution of the function call.

In another aspect, required information flows are enforced based on the at least one new class of software vulnerability.

In another aspect, whether presence of side-effects will lead to security vulnerability is determined.

In another aspect, whether an order of execution of function calls will lead to security vulnerability is determined.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
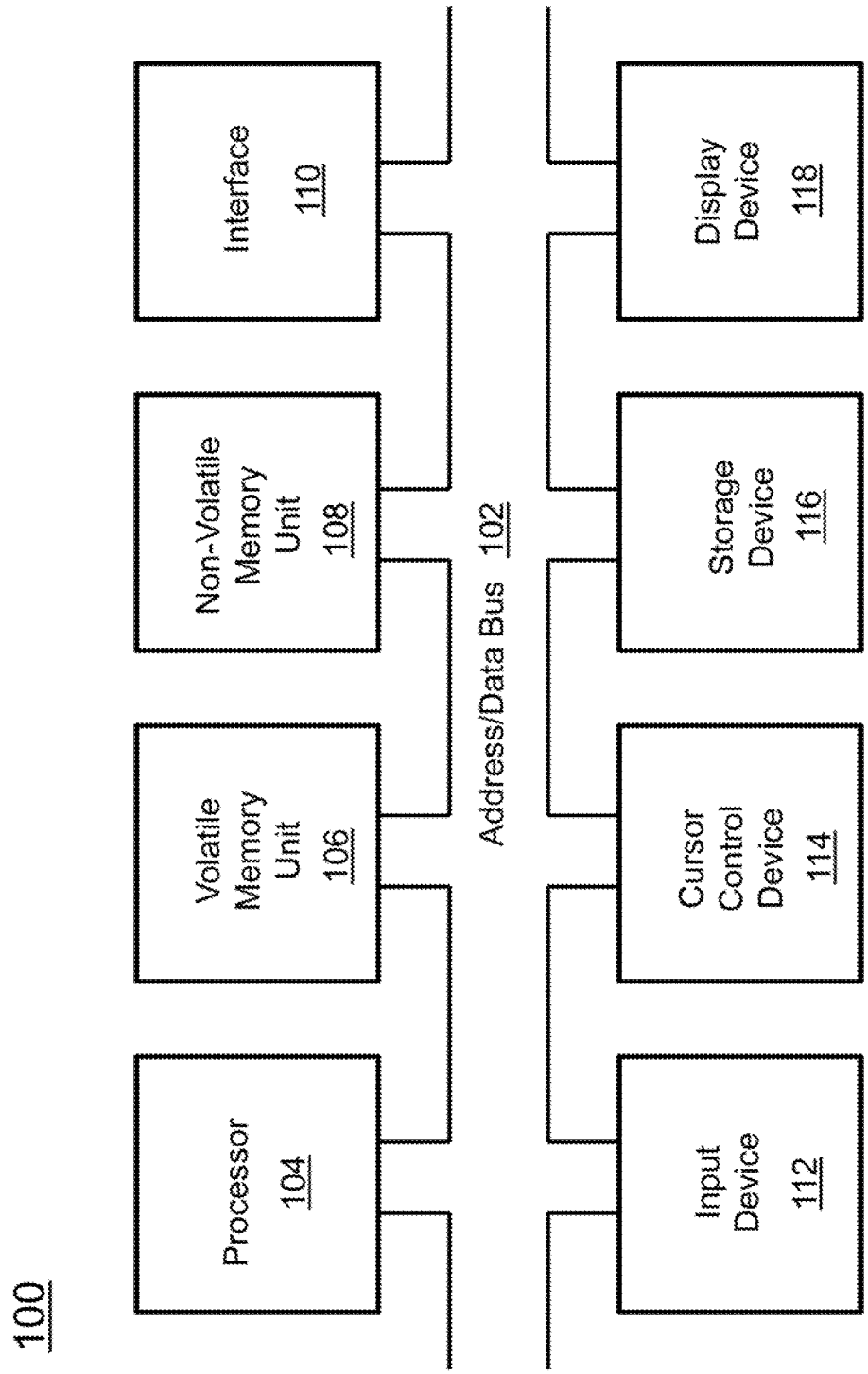
FIG. 1 is a block diagram depicting the components of a system for detecting missing authorization and authentication functionality in source code according to embodiments of the present disclosure.

The present invention relates to a system for detecting missing authorization and authentication functionality in source code and, more particularly, to a system for detecting missing authorization and authentication functionality in source code via type checking according to a variant of a security-type system. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Finally, specific details of the present invention are provided to give an understanding of the specific aspects.

(1) List of Incorporated Literature References

The following references are incorporated and cited throughout this application. For clarity and convenience, the references are listed herein as a central resource for the reader. The following references are hereby incorporated by reference as though fully included herein. The references are cited in the application by referring to the corresponding literature reference number, as follows:

1. Henry G. Baker. Lively linear lisp—look ma, no garbage! ACM SIGPLAN Notices, 27(8)89-98, 1992.
2. Lujo Bauer, Jarred Ligatti, and David Walker. Types and effects for non-interfering program monitors. In Proceedings of the 2002 Mext-NSF-JSPS international conference on Software security: theories and systems, ISSS'02, pages 154-171, Berlin, Heidelberg, 2003. Springer-Verlag.
3. Stephen Chong. Required information release. In Proceedings of the 23rd IEEE Computer Security Foundations Symposium, CSF 2010, Edinburgh, United Kingdom, Jul. 17-19, 2010.
4. Ravi Chugh, Jeffrey A. Meister, Ranjit Jhala, and Sorin Lerner. Staged information flow for javascript. In Proceedings of the 2009 ACM SIGPLAN conference on Programming language design and implementation, PLDI '09, pages 50-62, New York, N.Y., USA, 2009.
5. Cedric Fournet, Andrew Gordon, and Sergio Maffeis. A type discipline for authorization in distributed systems. In Proceedings of the 20th IEEE Computer Security Foundations Symposium, CSF '07, pages 31-48, Washington, D.C., USA, 2007.
6. William L. Harrison and James Hook. Achieving information flow security through monadic control of effects. J. Comput. Secur., 17(5):599-653, 2009.
7. Nevin Heintze and Jon C. Riecke. The slam calculus: programming with secrecy and integrity. In Proceedings of the 25th ACM SIGPLAN-SIGACT symposium on Principles of programming languages, POPL '98, pages 365-377, New York, N.Y., USA 1998.
8. Sebastian Hunt and David Sands. On flow-sensitive security types. In J. Gregory Morrisett and Simon L. Peyton Jones, editors, POPL, pages 79-90. ACM, 2006.
9. Atsushi Igarashi and Naoki Kobayashi. Resource usage analysis. In Proceedings of the 29th ACM SIGPLAN-SIGACT symposium on Principles of programming languages, POPL '02, pages 331-342, New York, N.Y., USA, 2002. ACM. ISBN 1-58113-450-9.
10. Yves Lafont. The linear abstract machine. In Theoretical Computer Science, 1988.
11. Ana Almeida Matos and José Fragoso Santos. Typing illegal information flows as program effects. In Proceedings of the 7th Workshop on Programming Languages and Analysis for Security, PLAS '12, pages 1:1-1:12, New York, N.Y., USA, 2012.
12. K. R. O'Neill, M. R. Clarkson, and S. Chong. Information-flow security for interactive programs. In Proceedings of the 19th IEEE Computer Security Foundations Workshop. IEEE Computer Society, June 2006.
13. Jens Palsberg. Type inference for objects. *Computing Surveys,* 28(2):358-359, June 1996.
14. François Pottier and Vincent Simonet. Information flow inference for ml. In Proceedings of the 29th ACM SIGPLAN-SIGACT symposium on Principles of programming languages, POPL '02, pages 319-330, New York, N.Y., USA, 2002.
15. John C. Reynolds. Syntactic control of interference. In ACM Symposium on Principles of Programming Langauges (POPL), Tucson, Ariz., January 1978.
16. John C. Reynolds. Syntactic control of interference, part 2. Technical report, Carnegie-Mellon University, April 1989.
17. J. A. Robinson. A machine-oriented logic based on the resolution principle. J. ACM 12, 1:23-41, January 1965.
18. Geoffrey S. Smith. Principal type schemes for functional programs with overloading and subtyping. Science of Computer Programming, 23(2-3):197-226, December 1994.
19. Philip Wadler. Linear types can change the world. In IFIP TC 2 Working Conference on Programming Concepts and Methods, Sea of Galilee, Israel, April 1990.
20. Lantian Zheng and Andrew C. Myers. Dynamic security labels and static information flow control. Int. J. Inf. Secur., 6(2):67-84, March 2007.
21. Nels E. Beckman and Aditya Nori. Probabilistic, Modular and Scalable Inference of Typestate Specifications. In Proceedings of The 32nd ACM SIGPLAN Conference on Programming Language Design and Implementation (PLDI '11) San Jose, USA, June, 2001.

(2) Principal Aspects

The present invention has three "principal" aspects. The first is a system for detecting missing authorization and authentication functionality in source code. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device, such as the user interface, a camera and/radar, or any combination of devices that provide the functionalities as described herein. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or an other display device suitable fir displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
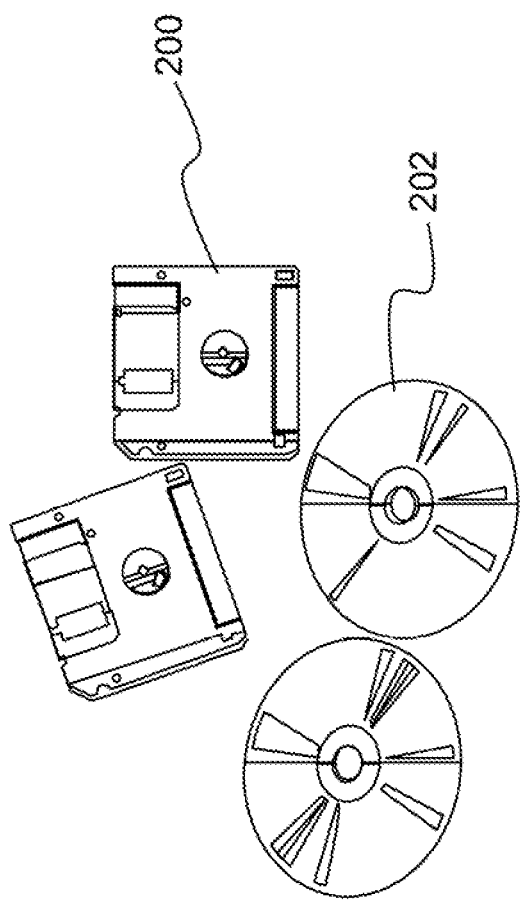
FIG. 2 is an illustration of a computer program product according to embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of the Invention

Described is a method for detecting missing authorization and authentication functionality in computer software source code via type checking according to a unique variant of a security-type system. A flexible security-type system is augmented to detect mismatches in information flow due to ordering and presence of side-effects in correct contexts, thus enabling detection of new classes of software vulnerabilities in source code. The security-type system has several unique aspects including the labeling of functions to control function calls as a form of implicit information flow and a general mechanism for enforcing a wide variety of required information flows (instead of only prohibiting information flows).

The system according to various embodiments of the present disclosure prevents security vulnerabilities in software due to missing function calls in the appropriate contexts (e.g., missing authorization checks). The present invention extends information flow security-type systems to permit or prohibit information flows based on security contexts derived from the presence of certain function calls (typically in the sense of authorization, authentication, or encryption), which might not act directly on the data whose information flow it is enabling. This technique is an advance beyond substructural type systems (especially ordered type systems) which enforce the presence and order of a function call, but not for an arbitrary lattice of function security levels and the data flows they enable.

The security-type system described herein allows a user to describe an arbitrary security policy of the data flow. The user can use the security-type system to make a detailed, precise policy of intentional behavior of the data flow. Thus, the security-type system is flexible. Additionally, the security-type system according to embodiments of the present disclosure is augmented with expressions that allow it to describe side effects of functions. A function has a side effect when a function modifies an outside state. Side effects may affect the flow of the algorithm and may be a source of unexpected security vulnerabilities. If functions have side-effects, then the order of executing functions matter and different order of execution sometimes lead to undesired behavior. Because the security-type system described herein is capable of capturing the side effects, whether the presence of side effects may lead to vulnerabilities or are safe can be determined. Similarly, one may also detect whether a different order of execution will lead to vulnerabilities, or if any order of execution is safe.

(3.1) Noninterference and Function Calls

In typical language-based information flow literature, an example of which is Literature Reference No. 20, explicit flows refer to assignment statements and implicit flows refer to control flow derived information manifested in assignments. Because information flow refers solely to flows between security levels (where each variable belongs to a single security level) as manifest in variable assignments, only program variables typically have an associated security label. Even advanced extensions of so-called security-typed languages, which support strong updates, relegate security labels to assignments variables. In certain more comprehensive security-type systems, the arrow type (i.e., function type) may have an associated security level, possibly even associating security levels to every identifier.

Although many software security vulnerability detection problems can be framed as a variable assignment noninterference problem (e.g., code injection), certain important vulnerabilities cannot. In particular, some security vulnerabilities are due to missing a call to a function (such as an authorization function) before a certain segment of code. In this case, the vulnerability may have nothing to do with the arguments which are passed to the function but rather whether the function itself is called in the appropriate context, where context is the position of the call in the control flow, and at which point it enables or authorizes subsequent information flows. This is because conventional information flow security-type systems track security levels only for the purpose of enforcing whether a statement or expression should be allowed to execute based on preceding control or data flow. The preceding control or data flow only refers to any preceding upclassification of values either directly (data flow) or indirectly (control flow). This means statements and expressions can only "disable" subsequent information flows, not enable them as in the missing function call scenario. The standard technique for enabling certain information flows is to declassify program variables. This, however, does not solve the missing function call issue because declassification, or its dual, endorsement, acts on specific program variables and not the program context.

The canonical example of the missing function problem is missing an authorization function. Certain computations in a program should not occur unless the authorization function is guaranteed to have been called. Note that the authorization function is neither a declassification nor an endorsement function, because it does not enable a particular information flow for a specific variable, but rather a class of information flow for an entire context. It would be insufficient to emulate this behavior by substituting the authorization function with an endorsement for a set of variables because that would require a priori knowledge of that specific set of variables and constant updates to that set when new functionality is added, which must be authorized. What is needed is a primitive to act directly on the program context. The scenario is the following: a privileged function p( ) should only be called if an authorization function a( ) was called beforehand. As with standard security-type systems, at each point in the program, there is a program context (pc) that denotes the highest lattice point permitted to execute (i.e., highest confidentiality or lowest integrity) at that point. Function identifiers are assigned (potentially implicitly) security labels according to the following as an example:

Example 1:

a( ); p( ) ok p( ); a( ) not ok.

There is a relationship with substructural type systems here, specifically linear and ordered type systems. In linear type systems, a variable with a linear type must be used exactly once. Such a type system achieves this behavior by prohibiting the weakening and contraction structural properties from being used during type checking. Ordered type systems further restrict type checking by prohibiting the exchange of structural property, thus enforcing the order of variable use. In the non-limiting example above, the function identifier a( )can be assigned a linear type to ensure that it is called. However, this is insufficient to enforce the desired property of a( ) preceding p( ). An ordered type system can enforce this second property by assigning both a( )and p( ) an ordered type (in that order). Such a type system would be sufficient for enforcing the security requirement that a( ) is called before p( ). Notice that the property of interest here is path sensitive.

However, when the problem is generalized to a nontrivial lattice relationship (i.e., an n-point lattice such that n>2) of authorization and privileged functions, an ordered type system is no longer sufficient to enforce the desired relationship. Consider, for example, the case of a 3-point lattice (H (high)-M (medium)-L (low)) corresponding to a super-user, an authorized user, and an unauthenticated guest. For each lattice point l, let $a_l$ and $p_l$ be a corresponding authorization and privileged function, respectively, such that $p_l$ is permitted to execute only in a context where $a_l'$ such that l $\sqsubseteq$ l' has returned, where $\sqsubseteq$ denotes square image of or equal to. Note that an ordinary ordered type assignment cannot concurrently satisfy these requirements. Ordinary ordered type systems require a total ordering between variables. More importantly, ordered types cannot enforce the l$\sqsubseteq$l' property.

Consider the following simplified imperative language, dubbed IEF (for Imperative Enforcing Flows):
l::=H|M₁|M₂|L
c:: if e then $c_1$ else $c_2$|call f|$c_1$;$c_2$
e:: true|false
f function identifiers
$\Gamma\emptyset$|[x:l]a mapping from identifiers
to l×l (called a function security label),
where l represents the security levels derived from the security lattice. Each function identifier f has an associated security level l. The command call f calls the function denoted by f and promotes the program context pc to the security level l associated with f (provided that l$\sqsupseteq$pc). $\Gamma$ is a type environment mapping identifiers (function identifiers in this language) to a pair of security levels, one for the security level required for executing a call and one for the security level granted upon execution. If identifiers (ids) can serve as labels, then a required input (in) label alone is sufficient for a function security label. Note that in this language, a single function call statement may enable multiple other function calls. Typechecking a function call will introduce a new granted security level into the environment and, thus, enable any subsequent call requiring this security level.

To illustrate extending information flow checking to the missing authorization problem, the following definition of a security lattice is used. An information flow security-type system is defined with respect to a security lattice. The lattice is characterized by a partial ordering $\sqsubseteq$ and two derivative operators join ($\sqcup$) and meet ($\sqcap$), defined as the least upper bound of two elements a and b in the lattice (i.e., a least element c such that c$\sqsupseteq$a and c$\sqsupseteq$b) and the greatest lower bound (i.e., a greatest element c such that c$\sqsubseteq$a and c$\sqsubseteq$b), respectively. The security lattice will be composed of four distinct levels such that L$\sqsubseteq$M₁,M₂$\sqsubseteq$H, and M₁ M₂ are incomparable. The type system contains function (arrow) types and unit types, a singleton type for the unit value ( ).

Well-typing of this language can be defined via the judgment $\Gamma$;pc|-c$\Rightarrow$l where $\Gamma$ is a type environment, pc is the program context (a security level), c is the command, and l is the resultant program context security level after executing c. Consider the following type system example for the above language.
Example 2:

$$\frac{\Gamma; pc \vdash e \Rightarrow l_0 \quad \Gamma; pc \sqcup l_0 \vdash c_1 \Rightarrow l_1 \quad \Gamma; pc \sqcup l_0 \vdash c_2 \Rightarrow l_2}{\Gamma; pc \vdash \text{if } e \text{ then } c_1 \text{ else } c_2 \Rightarrow l_0 \sqcup l_1 \sqcup l_2}$$

-continued $$\frac{\Gamma(f) = (l_1, l_2) \quad l_1 \sqsubseteq pc}{\Gamma; pc \vdash \text{call } f \Rightarrow l_2}$$

$$\frac{\Gamma; pc \vdash c_1 \Rightarrow l_1 \quad \Gamma; pc \sqcup l_1 \vdash c_2 \Rightarrow l_2}{\Gamma; pc \vdash c_1; c_2 \Rightarrow l_2}.$$

The type system is considerably different from a typical security-type system. The use of a resultant program context security level is distinguishing as is the function call rule that checks compatibility with the tuple function security label with labels for both required and resulting security levels. The above type system enforces a requirement that function f is only called when the program context is at least its required security level. Function calls where $\Gamma(f)=(l_1,l_2)$ may upgrade ($l_2 \sqsupseteq$ pc), downgrade ($l_2 \sqsubseteq$ pc), or maintain ($l_2$=pc) the program context. The language can be slightly enriched with a scoping construct {. . . } and an associated well-typing rule:

$$\frac{\Gamma; pc \vdash c \Rightarrow l}{\Gamma; pc \vdash \{c\} \Rightarrow pc}.$$

This rule enables function calls to locally upgrade or downgrade the program context without affecting the program context outside of local scope.

This language and type system can guarantee the presence of a function call. For Example 1, by assigning a unique security level $L_a$ to function a such that l$\sqsubseteq L_a$, where l is the required security level of any function call the call to a should precede, the type system will guarantee that a is called before any function p where $\Gamma(p)=(L_a,l')$. The call typing rule permits a single call to authorize multiple subsequent calls (i.e., any call that requires the granted security level). This is not the only possible design. Alternatively, one could use a linear typing rule to limit authorization to a single subsequent call (a single call authorizes one single call—one-to-one relation) or a call requiring multiple preceding calls in order to be authorized (e.g., call c is authorized only if it is preceded by both call a and call b). Let n be the number of identifiers in a program. If multiple calls contribute to a label, then for a sequence with in calls, there are $(n-1)2^{n-1}$ possible security labeling environments. If only one call contributes to enabling subsequent calls, then (n-1)! labeling environments are possible.

This kind of guaranteed enforcement can also apply to functional languages such as the one described below. To summarize, the steps to type checking are:
1. Build an environment that maps function identifiers to a tuple of two security labels, one for the required level for calling the function and one for the level instated after the function call. This environment can either be produced by explicitly labeling each function declaration/definition with a security level or, alternatively, deducing a label using heuristics based on the source of the function.
2. Type check the program using the security-typing relation defined by the rules in Example 2 to recursively calculate the resultant program context security level after each command.
3. Use the resultant program context security level as the program context for subsequent commands. Go back to step 2 until the entire program is checked.

Figure 3:
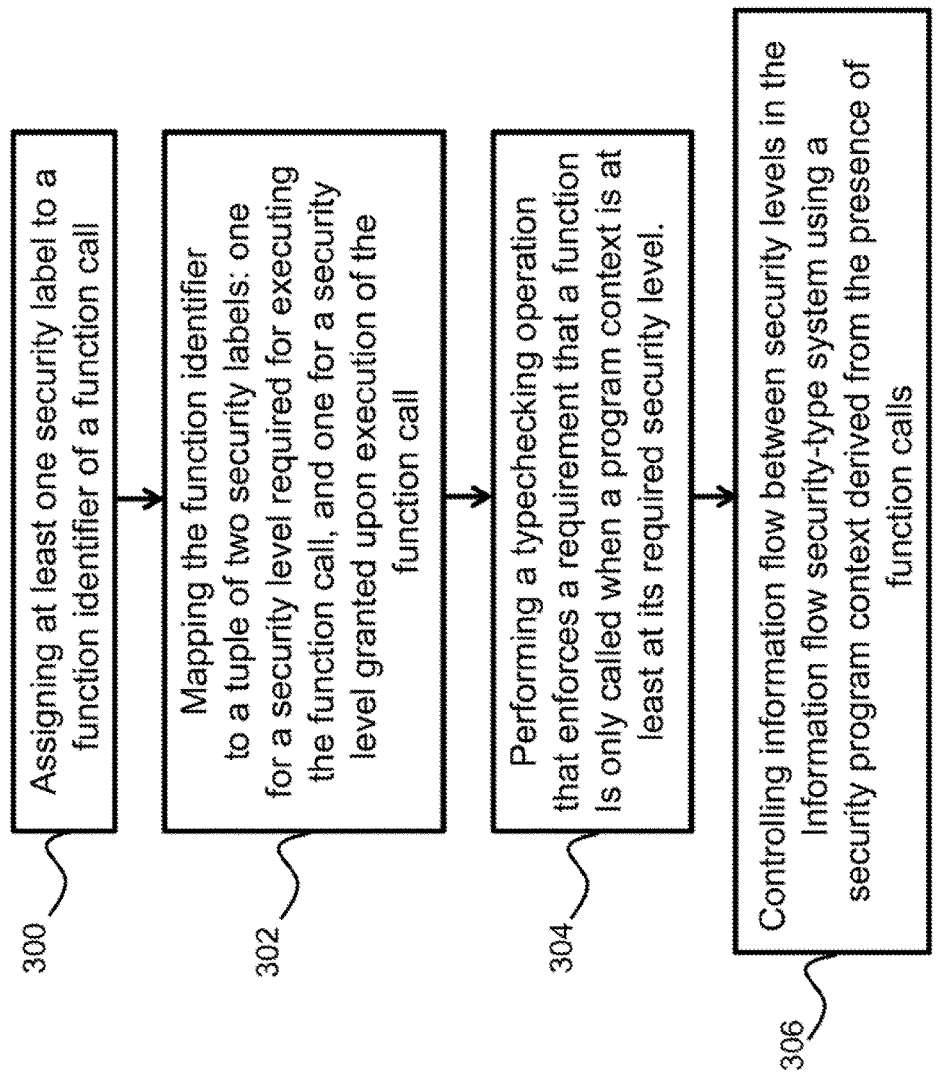
FIG. 3 is a flow diagram illustrating a system for detecting missing function calls in source code according to embodiments of the present disclosure.

FIG. 3 is a flow diagram depicting the process flow of the system according to the principles of the present invention.

As described above, at least one security label is assigned to function identifiers (element 300). In one aspect, a topic of two security labels is mapped to a function identifier: one for a security level required for executing the function call, and one for a security level granted upon execution of the function call (element 302). A typechecking operation is performed that enforces a requirement that a function is only called with a program context is at least as its required security level (element 304). The above allows for the controlling of information flow between security levels in an information flow security-types system using a security program context derived from the presence of function calls (element 306).

The above language and type system relies on the construction of an environment that provides security labels to all function identifiers. Because constructing such an environment is cumbersome, it would be useful to automatically deduce most of the function security labels in a given program. The essential ingredient for such automatic deduction (or, type reconstruction or inference) is the existence of a principal security labeling. A security labeling environment $\Gamma'$ is principal for a program c if for any labeling environment $\Gamma$ such that $\Gamma;pc\vdash c\Rightarrow l$, then $\Gamma$ is an instantiation of $\Gamma'$ such that there exists a label metavariable substitution mapping $\Gamma'$ to $\Gamma$. Generally, security label environments are inequivalent. Note that a given program may have multiple environments that satisfy the well-typing judgment. Transitivity implies a kind of derivative labeling for each labeling configuration. For example, a→b→c implies a→b and a,b→c. This, however, is sufficient to derive a notion of principal labeling. Consider the following example:

call a;call b;call c.

The environments $E_0=[a \mapsto (\emptyset, b_i)][b \mapsto (b_i, c_i)][(c \mapsto (c_i, \emptyset)]$ and $E_1=[a \mapsto (\emptyset, a_0)][b \mapsto (a\emptyset)][c \mapsto (a_0, \emptyset)]$ both satisfy the well-typing judgment for the above program. In the $E_0$ case, call a authorizes call b which in turn authorizes call c. In $E_1$, call a authorizes both call b and call c. Note that these two environments are inequivalent. However, they can both be instantiated from an environment schema according to the following:

$E_S=[a \mapsto (\emptyset, \alpha)][b \mapsto (\beta, \gamma)][c \mapsto (\delta, \emptyset)]$.

A nonstandard aspect is that in order to instantiate $E_S$ to $E_0$, both $\alpha$ and $\beta$ must instantiate to the same label $b_i$ and both $\gamma$ and $\delta$ must instantiate to the same $c_i$. $E_S$ itself does not necessarily satisfy the well-typing judgment, since it can instantiate to many environments that do not typecheck the program. Thus, $E_S$ must be constrained. In particular, the ordering a→b→c requires that the calls that come earlier cannot depend on a granted label that comes afterwards (e.g., a $\mapsto$ ($c_O$, . . . ) would be an inadmissible environment binding if $c_O$ is granted by only the call to c). The reverse of the sequence of calls defines exactly the environment bindings that are inadmissible. The reverse of the above would indicate that a cannot depend on an authorization grant label from b or c and b cannot depend on call c. Any environment that satisfies these requirements can satisfy the well-typing judgment for the program. Since call a cannot depend on b or c, that implies that the required label must be the null label $\emptyset$ since there are no other labels available in the program. Similarly, call b cannot depend on c, so it must either depend on call a or nothing. Finally, call c is free to depend on any label, and the choices are $\emptyset$, a, or b. Let the notation $\neq(\alpha,\beta)$ denote any security label in scope including $\emptyset$, but except $\alpha$ and $\beta$. A general schema for any environment that satisfies the above program is $[a \mapsto (\neq(\beta,\gamma),\alpha)][b \mapsto (\neq(\gamma),\beta)][c \mapsto (\neq(\ ),\gamma)]$.

In summary, the process is:
1. Collect the sequence of calls p in a program for each lexically scoped block. Generate a flesh label metavariable for each call. This label metavariable will denote the granted label for that call.
2. Construct a sequence s in the order the label metavariables were generated.
3. For the ith call in the sequence calling identifier $p_i$, create a binding $p_i \mapsto (\neq(S),s_i)$ such that $S=\{s_j\}$ where j>i.
4. For any instance of $\neq(\ )$, the algorithm is free to use any label metavariable in scope.
5.

The above algorithm is sufficient for producing admissible environments. However, because labels are ordered by a lattice and the function call rule has a subtyping side-condition, the above algorithm cannot produce all environments, especially the ones that satisfy the well-typing judgment by way of the subtyping side-condition. Since the function call rule contains a constraint, $l_1 \sqsubseteq pc$ where $l_1$ is the required security level of the caller, these constraints can be aggregated to solve for each security label. These constraints can usually be solved by variants of unification (see Literature Reference No. 17 for a description of variants of unification). However, the security-type system's security level lattice order implies a subtyping relationship. Type inference in the presence of subtyping entails semi-unification, which is in general undecidable. Various methods have been developed to work around this limitation (see Literature Reference Nos. 13 and 18 for descriptions of the various methods). The inference judgment has the form $\Gamma;pc\vdash c \triangleright \Gamma';l$ where $\Gamma'$ contains the security label constraints from the command c. The security-type representation must be extended to support security label metavariables $\xi$ which serve as placeholders for unknown security labels. Let the notation $\Gamma(f)\uparrow$ denote that f is undefined (i.e., not found) in $\Gamma$. Juxtaposition of environments (e.g., $\Gamma\Gamma_1$) denotes the concatenation of environments with $\Gamma_1$ shadowing the bindings in $\Gamma$. The following is an example of implicitly-labeled imperative enforcing flow (IIEF):

Example 3:

$$l::=\xi|L|H$$

$$\frac{\Gamma(f)\uparrow \quad \xi_i \text{ and } \xi_o \text{ are fresh}}{\Gamma; pc \vdash \text{call } f \triangleright [f:(\xi_i \sqsubseteq pc, \xi_o)]; \xi_o}$$

$$\frac{\Gamma(f)=(l_i, l_o)}{\Gamma; pc \vdash \text{call } f \triangleright [f:\mathcal{U}(l_i, pc), l_o)]; l_o}$$

$$\frac{\Gamma; pc \vdash c_1 \triangleright \Gamma_1; \quad \Gamma\Gamma_1; pc \vdash c_2 \triangleright \Gamma_2; l}{\Gamma; pc \vdash c_1; c_2 \triangleright \Gamma_2; l}.$$

For the implicitly-labeled language, the if-conditional rule remains the same except while propagating the security label information. Analogous to type reconstruction for languages with polymorphic type systems, any remaining security label metavariables must be eliminated at the end of the security label inference process. Security label metavariables are denoted by $\xi$. The semi-unification subroutine is denoted by U. The subtyping relationship implicit in the security-types suggests that $\bot$ or L would be the suitable "generic" security-type for any uninstantiated security label metavariable.

The security label reconstruction or inference algorithm as described by the inference judgment rules in the equations above can be outlined as follows:
1. Start with an empty environment.
2. Recursively type check the program.
3. Upon encountering a function call, check if the function identifier is in the environment. If yes, go to step 4. If no, go to step 5. If the program is completely type checked, go to step 6.
4. If the identifier is in the environment, look up the identifier in the environment to get the required and resultant security labels. Unify the required label with the current program context label pc. Return tee step 2 to check the remainder of the program.
5. In the case the identifier is not in the environment, create fresh security label metavariables $\xi_i$ and $\xi_o$. Return to step 2.
6. For any uninitialized security label metavariables in the resultant security label, initialize them to L.

This idea can also be extended to a functional language where the λ-expression is annotated with security labels at two points. The first security label, affixed to the λ symbol itself, represents the security context level enabled by the λ-expression, which is called the λ security level or label. The second, adjacent to the domain type, refers to the expected security level of the parameter, the parameter security level. In contrast to Heintze and Riecke's Slam (see Literature Reference No. 7) and Pottier and Simonet's MLIF (see Literature Reference No. 14) languages, the λ security level is not related to the security level of the λ-expression's body e. The following is an example of ML Enabling Flows (MLEF) language.

Example 4:

$s ::= H \mid M_1 \mid M_2 \mid L$        security labels $t ::= t \rightarrow t \mid \text{unit}$        types $e ::= \lambda^s x{:}^s t.e \mid ee \mid x \mid (\ )^s \mid \text{if } e \text{ then } e \text{ else } e$        expressions In the language (ML Enabling Flows, MLEF) above, the basic information flow property to be enforced is the following: functions expecting a parameter with security label s can only be applied to an argument with security label s' such that $s \sqsubseteq s'$. Thus, $(\lambda^H x{:}^H \text{unit}.x)(\ )^L$ is permissible whereas $(\lambda^H x{:}^L \text{unit}.x)(\ )^H$ is not because the former upclassifies the argument, whereas the latter attempts to declassify. The expression $(\lambda^H x{:}^L \text{unit}.x)(\ )^L$ is permissible only if the program context (program counter) is L.

$f(\ )\ \{$ $pc0 = L\ x0 = \text{input}(\ );$ $pc1 = L\ x1 = \text{authorize}(\ );$ ← Different from sanitization because not dealing with variables $pc2 = H\ x2 = \text{privileged\_f}(\ );$ ← privileged context $\}$ One possible embodiment of this technique is to detect missing authorization by typestate checking. Conventional information flow is concerned with explicit dataflow and implicit dataflow via control flow. In functional languages, first-class function passing is a kind of dataflow. When a function is called, it releases its content (the computation) via both the return value and side-effects. If a function is passed along and never called, it can be construed as no information flow has happened. Indeed, such parametric use of functions should not pose a problem. Context for function calls may include values of variables, whether other functions have or have not been called.

Coverage:
CWE (MITRE Corporation's Common Weakness Enumeration):
Missing Authentication for Critical Function
Missing Authorization
Missing Encryption of Sensitive Data
OWASP (Open Web Application Security Project organization's vulnerability list):
Insecure cryptographic storage
Broken authentication and session management
    bool isUserAuthenticated=o . . .
    public authenticateUser(. . . ) {
      o . . .
    }

The type system needs to manage side-effects (i.e., state changes at every point in the program). This is needed not just to detect leakage, but also to detect missing effects.
    authorizeUser( ) {isUserAuthentic=true }
    createNewAcct( ) {
      if (isUserAuthentic) {
        acct=new BankAcct( )
        acct.setAcctNumber( )
      }
    }
    if (secret>0) {
      public:=0
    }else {
      public:=1
    }
    createNewAccount(. . . ) {
      if (isUserAuthenticated) {
        o . . .
      }
    }

Also, functions themselves may be high or low security. For example, sql->execute( ) is high criticality, as well as createAcct( ).

According to CWE, the approach for addressing this is to partition a program into sections with varying privileges: anonymous, normal, privileged, and administrative. Note that these "program section privileges" amount to a lattice. The information flow security-type system's notion of a program counter subsumes this privilege construct and improves upon this concept by enabling program counter security level to be flow-sensitive.

(3.2) Desired Flow Enforcement

Information flow analysis typically enforces restrictions (proscription) on program information flows. What happens if what one wants to enforce is to guarantee the presence of an information flow (e.g., control flow) rather than the absence, which is what conventional information flow analysis enforces. In conventional information flow analysis, both a labeling of identifiers, data flow, and control flow must be fully specified. The analysis then proceeds to traverse the data flow and control flow graphs to enforce the absence of undesirable information flows (usually characterized as high to low). There are two kinds of information flows: data (explicit) flows and control (implicit) flows.

In the non-limiting example given below, standard information flow analysis would prohibit/flag lines 1 and 2 because there is an implicit flow from secret to public. The problem of detecting missing function calls is this: given a set of labeled identifiers (implying a set of required control flows) and a program using only those identifiers, reconstruct the control flow such that the program contains those required control flows.

Consider the following example of enforcing the presence of information flow. Let the goal be requiring that there exists information flow (via control flow) from H to L such that public:L and secret:H. The following example program does not have the required information flow:

Example 5:
public:=0
public:1

Observe that there are several solutions which satisfy the information flow requirement as shown in the example below.

Example 6:
   if (trusted)
   sensitive:=0
   sensitive:=1
   public:=0
   if (secret)
   public:=1
   if (secret) {
   public:=0
   public:=1
   }
   if (secret)
   public:=0
   if (secret)
   public:=1

The essence of information flow analysis is the enforcement of the absence of specific directions of information flows. There are three directions of information flow: level, declassification, and upclassification. In the simple case of explicit flows, the three directions can be illustrated as the following:

Level: H:=H or L:=L
Declassification: L:=H
Upclassification: H:=L

In the above example, H and L denote high and low security level variables, respectively. Standard information flow enforces the absence of the declassification direction of information flow. In particular, the rule for type checking assignment in a security-type system is as follows:

$$\frac{\Gamma(x) = l \quad pc \vdash e : l' \quad l \sqsupseteq l' \sqcup pc}{pc \vdash x := e : ok}$$

The key to the above rule is the side condition $l \sqsupseteq l' \sqcup pc$ which is permissive in that it permits all upclassification and propagation at the same security level. It specifically prohibits declassification. In the missing implicit flow problem, the system according to the principles of the present invention requires the presence of an implicit flow or prohibits the absence of an implicit flow. These two conditions are different. Consider the following example where the desired implicit flow is H→L:

1. Straightforward implicit: if (H) L
2. Missing implicit flow: L
3. Incomplete implicit flow: if (H) 0 where 0 is a no-op (in particular, an operation that contributes no data flow).

A policy that requires the presence of an implicit flow would reject both 2 and 3.

A policy that prohibits the absence of an implicit flow would reject 2 only.

The side condition in the typing rule for assignment can be rewritten to enforce either policy. Given that $\Gamma; pc \vdash e:l'$, $\Gamma(x) \sqsubset l'$ enforces a requirement that the result of the expression e must be declassified. The side condition $\Gamma(x) \sqsubset pc$ requires the program counter pc to be declassified, thus triggering a downward flow of the control flow. This enforces straightforward implicit flows. The side condition is a general mechanism for restricting information flow (either prohibitions or requirements). In particular, controlling the ordering between the sink (assigned variable) security level $\Gamma(x)$, the program counter pc, and assigned expression security level l' is critical. To control implicit flows, the ordering between $\Gamma(x)$ and pc must be specified. Equivalence ($\Gamma(x)$=pc) restricts implicit flows to only that within the same level. In particular, this would prohibit both upclassification and declassification of control flows. Containment ($\Gamma(x) \sqsupset pc$) requires declassification of control flow. The specification of implicit flows can be further extended to other relational/ordering operators $\sqsupset, \sqsubset$ to require declassification/level propagation and upclassification, respectively.

To disallow incomplete implicit flows, the typing rule for if-statements must be changed as follows:

$$\frac{\Gamma; pc \vdash e : l \quad \Gamma; pc \sqcup l \vdash c_0 \text{ ok} \quad \Gamma; pc \sqcup l \vdash c_1 \text{ ok}}{\Gamma; pc \vdash \text{if } e \text{ then } c_0 \text{ else } c_1}.$$

The standard if-statement security-typing rule only stipulates that implicit flows must be bounded by the security level (l) of the test-expression (e) in the if-statement.

Figure 4:
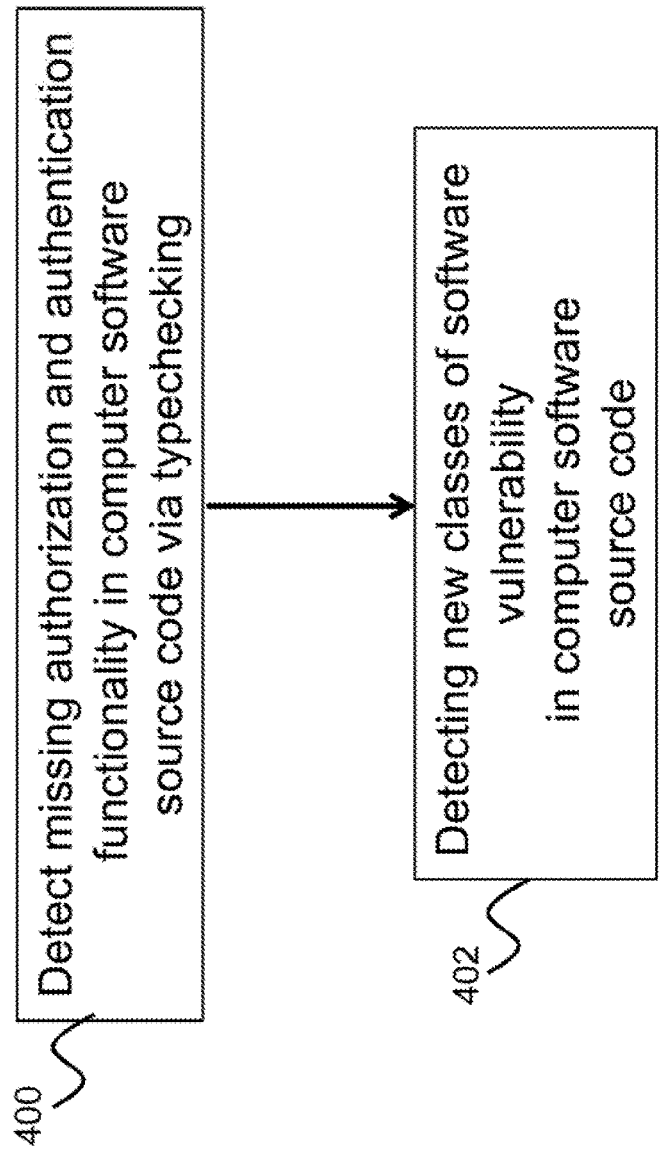
FIG. 4 is a flow diagram illustrating a system for detecting new classes of software vulnerability according to embodiments of the present disclosure.

FIG. 4 is a flow diagram illustrating a system for detecting new classes of software security vulnerabilities. In a first operation 400, missing authorization and authentication functionality in computer software source code via type-checking is detected. In a second operation 402, new classes of software vulnerability are detected in computer software source code, as described in detail above. Missing authorization, authentication, and encryption are three of the top 25 software vulnerabilities according to the Common Weakness Enumeration based on the National Vulnerability Database. The system described herein can improve software development and reduce development, testing, and integration costs by identifying these new classes of security flaws (e.g., missing authentication for critical function, missing authorization, missing encryption) early in the development process. As such, it would benefit software engineering activities and can serve as a component in a complete cybersecurity risk assessment and validation system product.

What is claimed is:

1. A system for preventing security vulnerabilities in software, the system comprising:
   one or more processors and a non-transitory computer-readable medium having executable instructions encoded thereon such that when executed, the one or more processors perform operations of:
      detecting, in computer software source code, missing function calls in appropriate security contexts, wherein varying security contexts represent varying ordered security levels of security-sensitive operations, applying a typechecking operation to enforce a requirement that a function is only called with a security context that is at least at its required security level; and detecting at least one new class of security flaws in the computer software source code to defend against cybersecurity risk.

2. The system as set forth in claim 1, wherein the one or more processors further perform an operation of assigning at least one security label to each function identifier in a function call, wherein the at least one security label is assigned to each function identifier to enable information flow, thereby enforcing a requirement that certain function calls must precede other function calls.

3. The system as set forth in claim 2, wherein each function identifier is mapped to a tuple of two security labels, a first security label for a security level required for executing the function call and a second security label for a security level granted upon execution of the function call.

4. The system as set forth in claim 1, wherein the one or more processors further perform an operation of enforcing required information flows based on the at least one new class of security flaws.

5. The system as set forth in claim 1, wherein the one or more processors further perform an operation of determining whether presence of side-effects will lead to security vulnerability.

6. The system as set forth in claim 1, wherein the one or more processors further perform an operation of determining whether an order of execution of function calls will lead to security vulnerability.

7. A computer-implemented for method detecting missing function calls in source code, comprising:

an act of causing one or more processors to execute instructions stored on a non-transitory memory such that upon execution, the one or more processors perform operations of:

detecting, in computer software source code, missing function calls in appropriate security contexts, wherein varying security contexts represent varying ordered security levels of security-sensitive operations, applying a typechecking operation to enforce a requirement that a function is only called with a security context that is at least at its required security level; and detecting at least one new class of security flaws in the computer software source code to defend against cybersecurity risk.

8. The method as set forth in claim 7, wherein the one or more processors further perform an operation of assigning at least one security label to each function identifier in a function call, wherein the at least one security label is assigned to each function identifier to enable information flow, thereby enforcing a requirement that certain function calls must precede other function calls.

9. The method as set forth in claim 8, wherein each function identifier is mapped to a tuple of two security labels, a first security label for a security level required for executing the function call and a second security label for a security level granted upon execution of the function call.

10. The method as set forth in claim 7, wherein the one or more processors further perform an operation of enforcing required information flows based on the at least one new class of security flaws.

11. The method as set forth in claim 7, wherein the one or more processors further perform an operation of determining whether presence of side-effects will lead to security vulnerability.

12. The method as set forth in claim 7, wherein the one or more processors further perform an operation of determining whether an order of execution of function calls will lead to security vulnerability.

13. A computer program product for detecting missing function calls in source code, comprising computer-readable instructions stored on a non-transitory computer-readable medium that are executable by a computer having a processor for causing the processor to perform operations of:

detecting, in computer software source code, missing function calls in appropriate security contexts, wherein varying security contexts represent varying ordered security levels of security-sensitive operations, applying a typechecking operation to enforce a requirement that a function is only called with a security context that is at least at its required security level; and detecting at least one new class of security flaws in the computer software source code to defend against cybersecurity risk.

14. The computer program product as set forth in claim 13, further comprising instructions for causing the one or more processors to further perform an operation of assigning at least one security label to each function identifier in a function call, wherein the at least one security label is assigned to each function identifier to enable information flow, thereby enforcing a requirement that certain function calls must precede other function calls.

15. The computer program product as set forth in claim 14, wherein each function identifier is mapped to a tuple of two security labels, a first security label for a security level required for executing the function call and a second security label for a security level granted upon execution of the function call.

16. The computer program product as set forth in claim 13, further comprising instructions for causing the one or more processors to further perform an operation of enforcing required information flows based on the at least one new class of security flaws.

17. The computer program product as set forth in claim 13, further comprising instructions for causing the one or more processors to further perform an operation of determining whether presence of side-effects will lead to security vulnerability.

18. The computer program product as set forth in claim 13, further comprising instructions for causing the one or more processors to further perform an operation of determining whether an order of execution of function calls will lead to security vulnerability.

* * * * *